Nov. 11, 1969 E. M. HAINES ET AL 3,478,285
ELECTRIC CROSSBAR SWITCHES
Filed Dec. 20, 1967 10 Sheets-Sheet 1

INVENTORS
ERNEST MARTIN HAINES
HENRY BASTIAN TAYLOR
BY Kirschstein, Kirschstein & Ottinger
ATTORNEYS

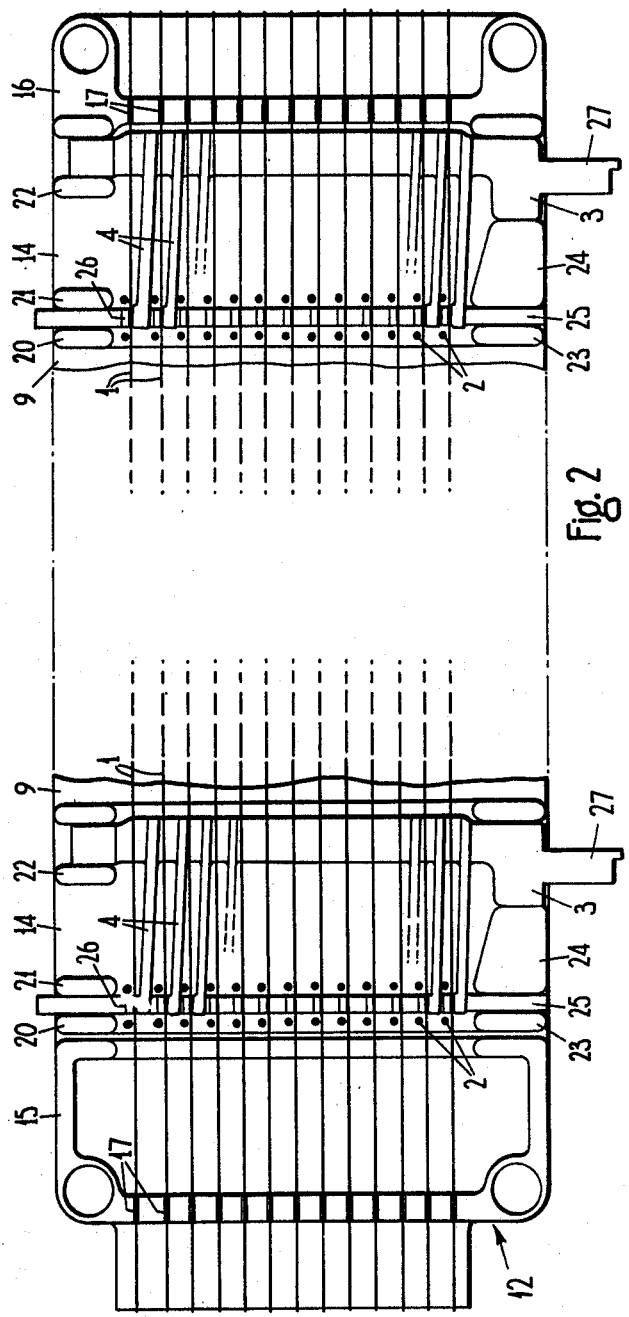
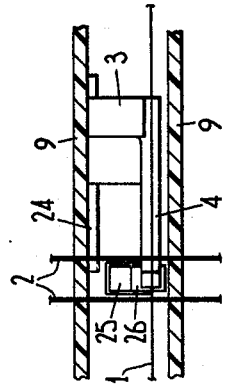

3,478,285
ELECTRIC CROSSBAR SWITCHES
Ernest Martin Haines, Pinner, and Henry Bastian Taylor, Coventry, England, assignors to The General Electric Company Limited, London, England, a British company
Filed Dec. 20, 1967, Ser. No. 692,074
Claims priority, application Great Britain, Dec. 22, 1966, 57,555/66
Int. Cl. H01h 67/14
U.S. Cl. 335—112
25 Claims

ABSTRACT OF THE DISCLOSURE

A crossbar switch comprises an array of contact sets in rows and columns, each contact set having multiple contacts operated in unison by movement, transverse to the matrix, of a contact driving member which must first be pivoted parallel to the plane of the array to attain an effective driving position, the two movements being imposed by respective coordinate members.

---

This invention relates to electric switches, for example for use in telephone exchanges. It is particularly concerned with coordinate switches an example of which is the cross bar switch having a plurality of first paths and a plurality of second paths and electromagnetically operated means for interconnecting selected first and second paths. In a crossbar switch the two coordinates are normally described as "horizontal" and "vertical" paths.

According to one aspect of the present invention, a coordinate switch comprises a matrix of contact sets arranged to be operable selectively by two sets of coordinate means, each contact set being operated by an associated interposer member which is arranged to be movable parallel to the plane of the matrix by one set of said coordinate means and, independently, transverse to the plane of the matrix by the other set of said coordinate means, the interposer member having two positions in which the associated contact set is, respectively, unoperated and operated, that position of an interposer member in which the associated contact set is operated being attainable only by a combination of said parallel and transverse movements. The matrix may be a rectangular matrix, one set of said coordinate means being associated with the rows of the matrix and the other set being associated with the columns of the matrix. The row coordinate means may comprise a member in respect of each row of contact sets and the column coordinate means a member in respect of each column of contact sets.

The matrix of contact sets preferably comprises a plurality of row conductors and a plurality of column conductors arranged coordinately, the row and column conductors being spaced apart at the cross points to constitute a contact set at each cross point, transverse movement of an interposer member in one direction being arranged to deflect a coordinate conductor of one set into contact with a coordinate conductor of the other set at the associated cross point.

The matrix of contact sets preferably comprises a plurality of tiers of conductors each tier comprising a set of row conductors and a set of column conductors so that each contact set comprises a plurality of contact pairs, one pair for each of said tiers, each pair comprising a row and a column conductor and all of which plurality of contact pairs are operable in unison by the associated interposer member.

Each contact set is preferably directly operated by a respective primary comb member having a number of teeth equal to the number of tiers, the teeth interleaving with the tiers and the tips of the teeth being aligned with the associated matrix cross point so that on movement of a comb member transverse to the matrix, the row conductors at the cross point are deflected by the teeth of the primary comb member and contact is made between the row and the column conductors of each pair of contacts at the cross point. Preferably, at each cross point of the matrix a secondary comb member is resiliently mounted so as to bear upon each row conductor in a direction such as to oppose contact between the row and column conductors of each said pair, a row conductor thereby being supported against deflection at points spaced by twice the column pitch when the row conductor is deflected between those points by a primary comb member in the operation of a contact set.

The rows of the matrix may be separated by partitions through which the column conductors extend, the column conductors being carried in close fitting holes incorporated in the partitions and the pitch of the columns being several times that of the rows so that the column conductors, constituting fixed contacts, are more rigidly supported than the row conductors, constituting movable contacts.

The matrix may comprise $m.n$ tiers, where $m$ and $n$ are plural integers, and in addition to the normal rows providing row coordinate paths through the switch, there may be $m$ rows in each of which the row conductors are present only in $n$ tiers the groups of $n$ tiers being wholly different in each of the $m$ rows, the row conductors in the $m$ rows each being in the form of a row of isolated conductor sections, one for each column, and the column conductors then extending through the $m$ rows in twin conductor form one of which twin conductors being connected to the column conductor in the said normal rows and the other of which twin conductors being connected to a terminal providing an external connection to the switch, the operation of a contact set in one of said $m$ rows consisting of the bridging of said twin conductors by a said conductor section in each tier of a group of $n$ tiers, the arrangement being such that for each column of the switch an $n$-wire input to the switch is connected to any of $m$- $n$-wire outputs from the switch for each normal row of the switch according to which of the said $m$ rows is selected for the operation of a contact set.

According to another aspect of the invention, a coordinate switch comprises a rectangular matrix of contact sets arranged to be operable selectively by two sets of coordinate means associated with the rows and columns of contact sets respectively, each contact set being operated by an associated interposer member which is arranged to be movable parallel to the plane of the matrix by one set of said coordinate means and, independently, transverse to the plane of the matrix by the other set of said coordinate means, the interposer member having first and second positions with respect to each of the parallel and transverse movements, the coincidence of the two first positions providing a normal position of the interposer member in which the associated contact set is unoperated and the coincidence of the two second positions providing an operated position of the interposer member in which the associated contact set is operated, the operated position being attainable only by a combination of said parallel and transverse movements.

Each interposer member may be mounted on an arm extending transversely to the matrix, the arms being subject to pivotal movement about axes parallel to the matrix columns so that small such movements produce movement of the interposer members substantially parallel to the plane of the matrix, each column of arms, corresponding to a column of the contact sets, being movable in unison transversely to the matrix by associated electromagnetic means, corresponding arms in each column being disposed in rows corresponding to the rows of contact sets and each row of arms being pivotally movable in unison by associated electromagnetic means, the interposer members occupying their said first positions when said electromagnetic means are energised and, when the electromagnetic means associated with a particular row and a particular column are energised appropriately the interpose member common to the row and column occupying its said second positions in which the associated contact set is operated.

According to a further aspect of the invention, a coordinate switch comprises a rectangular matrix of contact sets arranged to be operable selectively by two sets of coordinate means associated respectively with the rows and columns of contact sets, each contact set having associated with it a respective interposer member which is biased in one direction transverse to the plane of the matrix and which is operable by its associated column coordinate means to move transversely to the matrix and against the bias, the interposer member then being pivotable, about an axis parallel to the plane of the matrix, by its associated row coordinate means to a position from which, on release of said column coordinate means, it moves subject to said bias to an operated position in which the associated contact set is operated, the interposer member not being engageable by said row coordinate means in the released condition of said column coordinate means.

Each contact set of one row may be reserved as an off-normal contact set for the column it occupies, each such off-normal contact set being operated by an associated off-normal interposer member which is movable transverse to said matrix in unison with the other interposer members of the column, being also pivotable about said axis parallel to the matrix and loosely coupled to said other members so that operation of the off-normal contact set of a column coincides with non-operation of all of the other contact sets of the column and operation of any one or more of said other contact sets effects release of the off-normal contact set.

According to a further aspect of the invention, a coordinate switch comprises a rectangular matrix of contact sets, arranged in rows and columns, a plurality of interposer members each mounted adjacent a respective contact set for operating the contact set, a plurality of row coordinate members which are each mounted for sliding parallel to a respective row and each of which is adapted to be coupled to the interposer members of a row so as to move them parallel to the row, a plurality of column coordinate members each mounted so as to couple with the interposer members of a respective column and move them transversely to the plane of the matrix, a contact set being operated by the associaed interposer member when moved by both of the associated row and column coordinate members, a plurality of electromagnetic means operatively associated with the row coordinate members respectively, and a plurality of electromagnetic means operatively associated with the column coordinate means respectively.

As used in this specification a coordinate switch is to be taken as one having a plurality of contact sets which are grouped in two ways such that each contact set occurs in one group of the first grouping and in one group of the second grouping, each contact set being uniquely defined by two such groups and operated by selective operation of each of two coordinate systems of operating members which systems respectively select the two groups.

Two embodiments of a coordinate switch in accordance with the invention will now be described, by way of example, with reference to the accompanying drawings, of which FIGURE 1 is a perspective diagrammatic view of the first embodiment of switch showing the overall arrangement;

FIGURES 2 and 3 are a plan and a fragmentary sectional rear elevation of part of the switch;

FIGURES 11 and 12 are plan end views of the switch, FIGURE 11 being partially broken away to show a contact set;

FIGURE 13 is a rear elevation of a matrix comprising the contacts of the switch;

FIGURE 14 is a rear elevation of the switch minus the matrix;

FIGURE 15 is a fragmentary plan view of the switch minus the matrix, and

FIGURE 16 is an end view of the switch minus the matrix.

Both embodiments of switch will be described with reference to their intended operating dispositions.

The first embodiment is a switch required to provide selective interconnection between any one of twenty one sets (each of thirteen parallel circuits) and any one of a further 10 sets (again each of thirteen parallel circuits). Generally only twelve of the thirteen parallel circuits will provide telephone line circuits the extra circuit being provided for contingencies.

Figure 1:
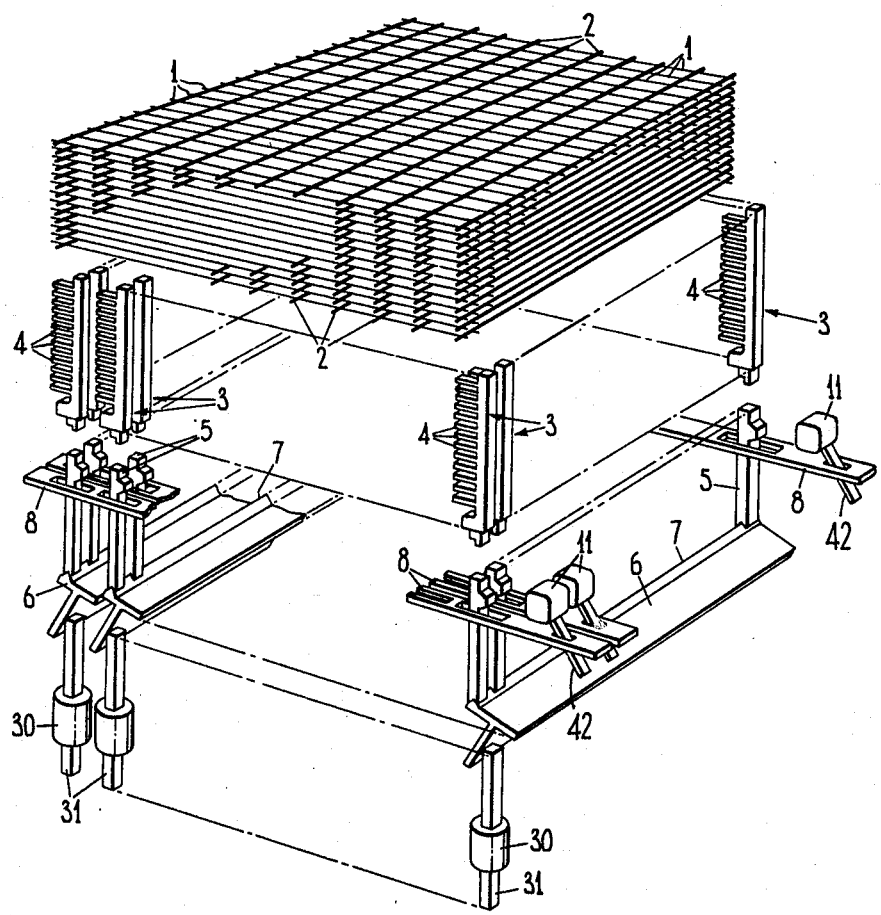

Referring to FIGURE 1, the basic arrangement of the switch is as follows. An interconnection as mentioned above is made by effecting contact between one of a number of row conductors, referenced 1, and one of a number of column conductors, referenced 2. The row conductors 1 and the column conductors 2 are arranged in thirteen tiers, each tier comprising twenty-one row conductors 1 and ten column conductors 2 arranged coordinately to provide 210 cross points at which contact is required to be made selectively. (FIGURE 1 in fact shows, for clarity, the switch oriented through 90° from its operative condition in which the rows are horizontal and the columns vertical.)

The row conductors 1 are spaced apart from the column conductors 2 in each tier by a small amount so as normally to provide no interconnection between the rows and columns. The thirteen contacting conductor portions at each cross point constitute a contact set associated with that particular cross point. The whole array of conductors can therefore be seen to provide a rectangular matrix of 210 contact sets.

Although, for simplicity, the column conductors 2 are shown in FIGURE 1 as single wires, they are in fact in pairs, the two wires of each pair being looped outside the matrix to provide the electrical equivalent of FIGURE 1. This feature whereby a redundant contact is provided is common practice in telephony. The loop conductors 2 appear as pairs of wires in subsequent figures.

In addition to the contact sets provided by the conductors 1 and 2 there is a further row of contact sets, making twenty two rows, this further row extending each column of contact sets by one. The contacts of these extra contact sets do not provide line interconnecting points but simply provide indication of their associated columns being off-normal, that is, having a cross point in that column in use.

Each cross point contact set is operated by an operating member in the form of a comb 3 which is mounted so that the teeth 4 of the comb interleave the tiers of the conductors 1 and 2. The comb 3 is shown, in detail, in FIGURES 4 and 5 and, mounted, in FIGURES 2 and 3. In FIGURE 1 the combs 3 are shown diagrammatically and, for clarity, disengaged from but directly below their various cross points. Again in FIGURE 1 interposers 5 are shown diagrammatically beneath their respective combs 3, one interposer 5 for each comb 3. There are thus ten columns of interposers 5, with twenty two interposers in each column. As will be explained subsequently the last row of interposers 5 associated with the off-normal contact sets are operated in a different manner from the remainder of the interposers.

The interposers 5 are movable transverse to the plane of the contact set matrix, that is, vertically in FIGURE 1. They are also pivotable about axes parallel to the columns of the matrix, being mounted on column armatures 6 each of which provides a knife edge support 7 for the twenty-two interposers 5. Pivotal movement of the interposers is effected in certain conditions by select bars, 8 of which there are twenty-one and each of which is coupled to the ten interposers 5 of a row. In the present particular example each select bar 8 is operable selectively by a respective electro-magnet 11.

It can be seen that the select bars 8 and the column armatures 6 constitute two sets of coordinate members and it will be subsequently explained how operation of a selected contact set is effected by means of these coordinate members.

The overall arrangement having now been briefly described, the switch will be described in more detail. The conductor multiple, comprising the thirteen tiers of row and column conductors 1 and 2, is housed in an assembly of vertical insulating partitions or spacer frames 12 shown in FIGURES 2 and 3.

Each spacer frame 12 houses thirteen row conductors 1 disposed in a horizontal plane, the column conductors 2 extending transversely through the plane. A spacer frame comprises a partition 9 comprising a plane sheet of insulating material having clearance holes disposed for passage of the column conductors 2 and for fixing screws, an insulating member 14 being mounted across the width of the sheet, for each column. The members 14 have preformed holes by means of which they are riveted to the partition 9 and are also provided with thirteen pairs of holes for the column conductors. These holes fit closely on the column conductors 2 and are accurately positioned with respect to the lower extremity of the member 14 (as viewed in FIGURE 2) so that the column conductors 2 can be accurately positioned with respect to a datum surface against which the lower ends of the members 14 abut. In addition two end members 15 and 16 which support the row conductors are mounted across the partition 9 at the ends thereof. Slots 17 are cut into the end members to receive the row conductors 1. The slots 17 are an easy fit around the conductors 1. In the end member 16 the conductors 1 are left free while in the end member 15 the conductors 1 are clamped by means not shown and taken to terminal connections also not shown. Within the spacer frame 12, each comb is required to slide vertically, that is, within the plane of the frame. This is effected in the following manner. Each of the members 14 has upstanding portions 20, 21, 22, 23 and 24. The upper end of the back of each comb 3 is shaped to slide in the guide formed by the portions 22 and 20 of adjacent members 14 while the lower end is guided by portions 24 and 23 of adjacent members 14. The combs 3 are positioned in their various guides all facing the same way in the plane of the frame 12. The teeth 4 of the combs 3 are of such a length that they extend almost from one vertical line of conductors 2 to the next line of conductors 2. This cantilever form of the operating members (the combs 3) provides resilience such as to accommodate variations in the conductor positioning while avoiding the use of material which is excessively resilient inherently. The tips 13 of the comb teeth 4 each underlie a loop conductor 2 there being sufficient gap between tip 13 and loop conductor 2 to permit the row conductor 1 to pass between without contacting either. The tips 13 of the teeth 4 are curved to present a convex surface to the overlying row conductors 1 thus tending to equalize the contact pressures between each conductor of a pair 2 and the associated row conductor 1. The material of the combs 3 is a plastics insulating material which is inherently slightly resilient.

Figure 4:
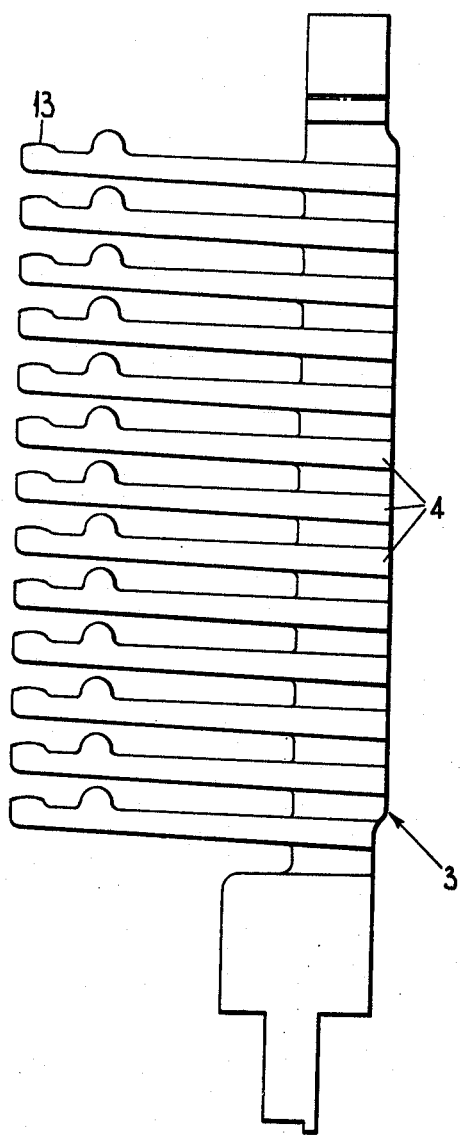
FIGURES 4 and 5 are plan and elevation of a detail of the switch.
Figure 5:
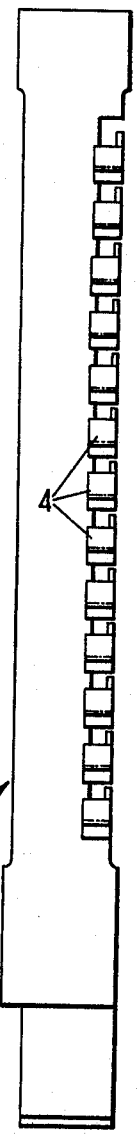

Referring to FIGURES 4 and 5 in addition, it can be seen that the teeth 4 of each comb 3 are offset from the back of the comb so that a row conductor can overlie a tooth symmetrically without being obstructed by the back of the comb. The teeth 4 of the combs are directed upwardly away from the back of the comb so that the row conductor 1 is not fouled by the root of a tooth 4 as the teeth deflect on engagement.

In addition to the combs 3 secondary combs 25 are provided. These secondary combs 25 are of the same tooth pitch as the combs 3 and are directed transverse to the spacer frame 12. The lower side of each tooth of the comb 25 (viewed in FIGURE 2) is accurately positioned with respect to the lower extremity of the comb 25. The length of the teeth 26 of the secondary combs 25 is comparable to the thickness of the frame 12, the teeth 26 having to extend only across the thickness of the teeth 4 of the combs 3. Combs 25 are positioned one on each member 14 between the guide formed by the portions 20 and 21 at the top and 23 and 24 at the bottom. As can be seen from FIGURE 2 the width of the teeth 26 is such that they may pass between the wires of each column conductor pair without obstruction. Each tooth 26 of a comb 25 bears lightly and resiliently upon the upper surface of a row conductor 1 thus locating the thirteen row conductors relative to each other and relative to the lower end of the comb 25 which abuts against a datum surface. Spring means (not shown) is applied at the top of each secondary comb 25 to provide the slight downward bias on each comb. The main comb 3 is left floating. Both row and column conductors 1 and 2 are therefore located with respect to a datum surface which is provided by a plate (not shown).

At the bottom of each comb 3 is an integral extension 27 which protrudes down below the plate 12 and by means of which the particular cross point is operated. This extension 27 is engaged during operation by the mechanism shown particularly in FIGURES 8 and 9.

Figure 8:
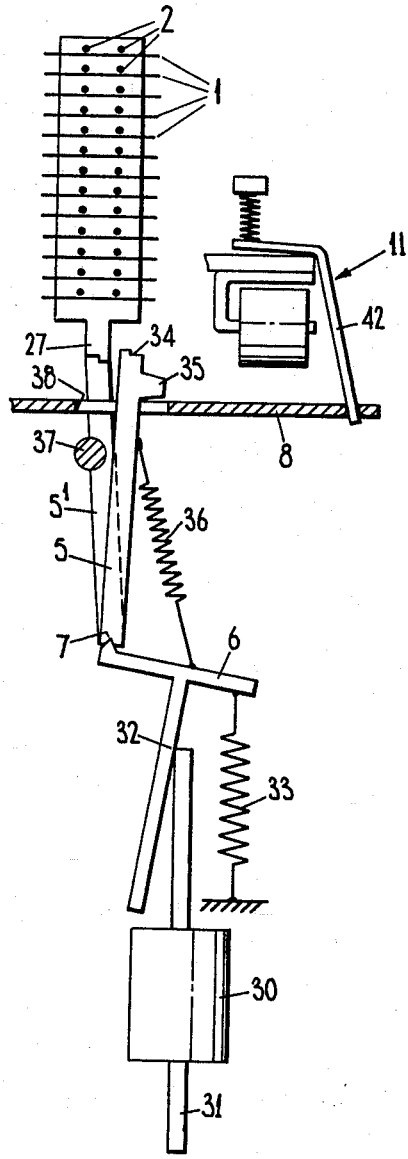
FIGURES 8 and 9 are plan views of a detail of the operating mechanism in two operative conditions.
Figure 9:
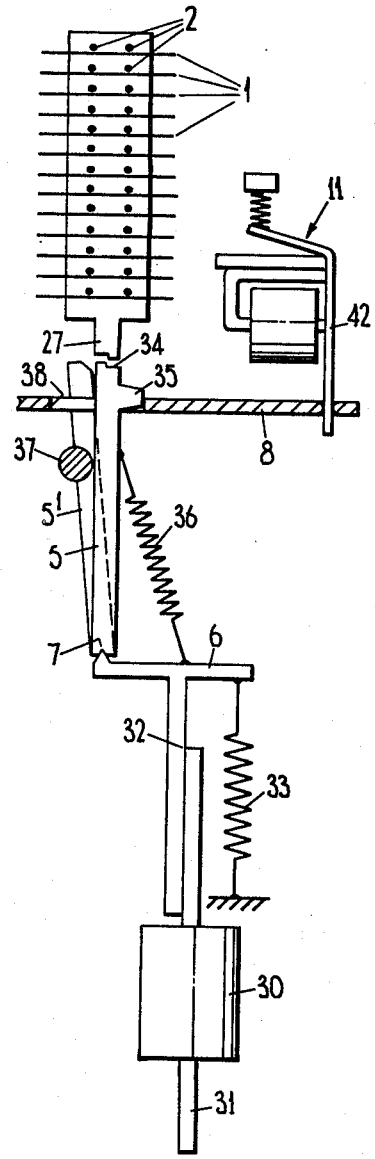

Referring to FIGURES 1, 8 and 9, the matrix of conductors 1, 2, and their spacer frames 12 are mounted on the above reference plate (not shown) on which the select bars 8 slide. Underneath this plate are mounted ten electro-magnets 30 each having a yoke 31 and an armature 6 previously mentioned. The electro-magnets 11 and 30 associated respectively with the rows and columns of the matrix, correspond with the select and bridge magnets of previously proposed switches and will be referred to as such in this specification.

The armature 6 is of T section and is pivoted about an axis 32 transverse to the plane of FIGURE 8 and near the top of the upright of the T. The cross bar of the T has an upstanding knife-edge 7 at one edge extending along the associated column. A spring 33 biases the armature 6 into the position shown, that is, with the knife edge 7 in the upper one of its two operative positions.

The twenty-two interposers 5, including the off-normal interposer 5′ previously mentioned, are pivoted at their bottom ends on the knife-edge 7 each underlying its respective row. Each interposer 5 is a rectangular section bar having a V groove in its bottom edge to engage the knife edge 7, the V groove being along the shorter dimension of the section. In the upper end is a step or detent 34 which is complementary to the step in the bottom end of the cooperating comb 3 (shown diagrammatically in FIGURES 8 and 9). A short distance below the step 34 in each interposer 5 is a horizontal protrusion 35 of the same thickness as the remainder of the interposer with which it is integral. All twenty-two of the interposers 5 are biased clockwise about the knife-edge 7 in FIGURES 8 and 9 by individual springs 36 attached between the interposers 5 and the top of the armature 6. The springs 36 are insufficiently strong to rotate the armature 6 against the bias imposed by the spring 33.

The off-normal interposer 5' of each column is similar to the remainder of the interposers except that it has mounted on it a coupling bar 37 which extends transversely to the interposer and adjacent to one edge of each of the interposers 5. This coupling bar 37 prevents alignment of the off-normal interposer 5' and any of the others. Also if any one or more of the interposers 5 are driven anticlockwise they will displace the off-normal interposer 5' and drive it in the same direction. The effect is that the off-normal interposer 5' can only be in engagement with the part 27 of the associated comb 3 when no other interposer of that column is engaged. Thus, when the off-normal interposer 5' is in the home position all of the cross-points of that column are free.

The select bars 8 each have a series of regularly spaced apertures 38 each embracing an interposer 5 of the row. There are thus twenty-one select bars 8. Mounted at one end of each select bar 8 is the select electromagnet 11 having an armature 42. The armature 42 is in the form of an inverted L and is pivoted at its elbow. As shown in FIGURE 8, the vertical portion extends through a hole in the select bar 8 while the horizontal portion is spring biased downwardly so driving the select bar 8 to the right in FIGURE 8. Energisation of the select manget 11 causes the vertical portion of the armature 42 to move to the left against the spring bias and so drive the select bar to the left. On release of the electromagnet the select bar 8 will return to its former position. The holes 38 in each cross bar are such that only the right hand edge of the hole can ever engage an interposer 5 and that only when the protrusion 35 lies within the hole 38 as shown in FIGURE 9.

The operation of the mechanism is as follows.

In FIGURE 8 none of the interposers 5 is engaged with its respective comb 3 so that all of the cross-points of the column can be said to be in a normal (i.e. un-selected) condition. The homing interposer 5' is engaged with its comb 3 and the contacts associated with that comb are closed.

On energization of bridge magnet 30 the armature 6 pivots anticlockwise until the stem of the T lies adjacent the yoke 31. In consequence all twenty-two interposers are displaced downwardly against the bias of the spring 33 so disengaging the off-normal interposer 5' from the extension 27 of its comb 3. The twenty-one interposers 5 are then in a position in which their protrusions 35 are in a position to obstruct horizontal movement of the respective select bars 8. If at this stage a particular select magnet 11 is operated the armature 42 is rotated clockwise and the associated select bar 8 is driven to the left in FIGURE 8. The obstructing interposer 5 is biased into its obstructing position i.e. against the edge of the select bar aperture 38, by the spring 36. This bias is overcome by the select bar 8 which consequently pivots the selected interposer 5 anticlockwise to the position shown in FIGURE 9. The remaining interposer members 5 (not shown in FIGURE 9) are unaffected by this transverse motion of the selected bar 8. The selected interposer 5, on pivoting anticlockwise engages the coupling bar 37 and drives the off-normal interposer 5' anticlockwise and out of alignment with the extension 27 of its comb 3. Release of bridge magnet 30 in this condition permits all twenty two of the interposers to rise subject to the bias of the spring 33. Only the selected interposer 5 is then aligned with a comb 3 and the step 34 at the top of the selected interposer 5 engages the complementary step on the extension 27 of the selected comb 3 as the interposer rises. The step is engaged before the protrusion 35 escapes from the aperture 38 and the step is directed so as to trap or latch the itnerposer into engagement with the selected comb 3. Further upward movement of the selected interposer 5 effects operation of the associated cross point contacts. After this stage of the operation the off-normal interposer 5' does not engage its comb and the off-normal contacts are therefore operated indicating the off-normal condition.

The select magnet 11 can then be released with no change in the switching, the actuated cross bar merely returning to its former position. Any further operation of the same select bar will not affect the existing connection unless the associated bridge magnet is also operated.

When it is required to trip the connection the bridge magnet 30 alone is energised transitorily in which case the latched interposer drops out of engagement with the extension 27 of the associated comb 3. The off-normal interposer 5' is at the same time biased by its own spring 36 into the aligned position and on release of the bridge magnet 30 it rises to close the off-normal contacts, again indicating that condition.

When therefore it is required to interconnect a particular group of thirteen row conductors 1 with a particular group of thirteen column conductors 2, first a pulse is applied to the particular bridge magnet 30 after which a pulse is applied to the particular select magnet 41. The bridge magnet 30 is then released by cessation of the applied pulse, after which the select magnetic 11 is similarly released.

It will be appreciated that the invention is not restricted to arrangements in which the coordinate means comprises a respective member unique to each row and column. The invention embraces arrangements in which for example the row selection is effected by means of a coded arrangement of electromagnets and code bars each of which may be common to some or all of the rows. Such code bars may for example each have a number of apertures in a coded sequence so that operation of the code bars selectively effects alignment of the apertures associated with a particular row. One advantage of the arrangement first described, is that it avoids the necessity of non-standard code bars each of which would have to be manufactured to close tolerances thus increasing manufacturing costs. In an alternative coding arrangement, the select bars are identical but are selected by operation of coded combinations of select magnets.

Having now described the basic switch and its operation in some detail, a modified construction will be described with reference to FIGURES 6, 7 and 10. The modified construction is for application where it is required to increase the number of outlet connections available to a particular inlet connection. With a fixed number of interconnections within the switch an increase in availability can clearly only be achieved with a reduction in the number of inlets. However this is acceptable in some circumstances.

It will be appreciated that in the arrangement already described it is preferable that the inlets are provided by the column conductors and the outlets by the row conductors. This is because only 10 (sets of parallel) signal paths can be carried by the switch and when the switch is thus fully occupied it is better that there are then unused outlets rather than unused inlets. The latter alternative would require complex marking to indicate that the switch was full even though a selected inlet was unused.

This situation applies equally to the modified construction so that input signals to the switch are applied to the column conductors. An increase in the available outlets as mentioned above, is achieved by collecting the conductors of each column into groups and commoning the conductors within each group. For example a four-wire system may be used instead of the twelve wire of the basic arrangement. Such a system is shown diagrammatically in FIGURE 10, which shows a plane of the matrix transverse to the row conductors (shown as triangles) and coincident with one of the columns. In this case each set of twelve column conductors 2 is divided into three groups each of four conductors; three column conductors, one from each group, providing one of the four wires in a manner to be described.

For a four-wire input to the switch three of the rows have to be sacrificed to obtain the increased availability. These three rows will be called level-switching rows and are partly illustrated in FIGURES 6 and 7. The level-switching rows (row Nos. 1, 2 and 3 in FIGURE 10) are similar to the remainder in having contact sets and combs in respect of each column. However there are no row conductors 1 as much, extending the length of the switch as in the remaining rows. Referring to FIGURES 6 and 7, in each level-switching row each comb 3 carries four bridging members 55 on adjacent teeth 4. The member 55 is a wire similar to that of the row conductors 1 but of hairpin form. It is located on its supporting tooth 4 by two moulded extensions 56, 57 so that the open end of the hairpin underlies the associated column conductors 2.

One leg of each loop conductor 2 extends transversely through the level-switching rows and the remaining rows alike. The other leg terminates as shown in FIGURE 7 at the position 53 between the level-switching rows and the remaining rows i.e. between row 4 and row 3. External connection to a particular column conductor pair is made to a short length of conductor 52 which traverses only the level-switching rows replacing the severed portion of the terminated loop conductor 2. Connection to the particular column loop conductor 2 can therefore be effected by bridging the conductor 52 and the longer leg of the loop conductor 2 within a level-switching row by means of a bridging member 55.

Figure 10:
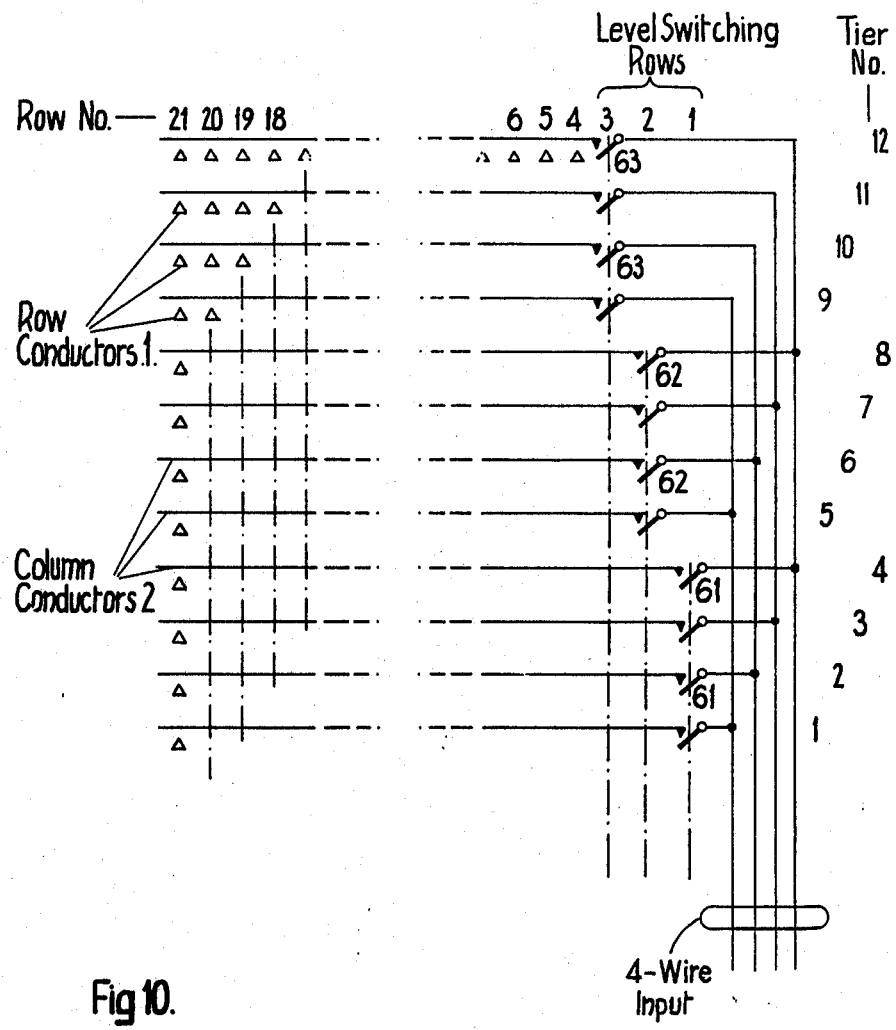
FIGURE 10 is a schematic circuit diagram showing a plane through one column of the switch in the modified construction.

In FIGURE 10 the level-switching bridging members 55 are shown as contacts 61, 62 and 63, that part of each conductor on the right of a contact (61, 62 or 63) corresponding to the conductor 52, and that part on the left corresponding to the loop conductor 2.

Figure 6:
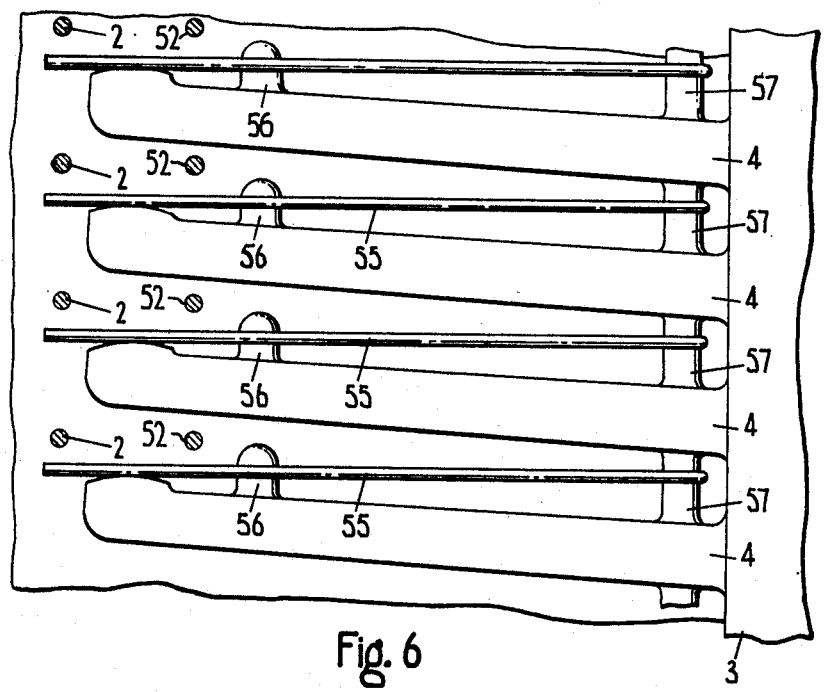
FIGURES 6 and 7 are fragmentary plan and rear elevation of the switch showing a modification.

Four loop conductors of a column are connected to corresponding conductors 52 in unison by the four bridging members 55 on adjacent teeth of a comb 3, as shown in FIGURE 6. In the first level-switching row (row 1) the bridging members 55 are positioned on the lowest four teeth 4 of each comb 3. In the second level-switching row (row 2) they are positioned on the next group of four teeth and in the third level-switching row (row 3) they are positioned on the next group of four teeth so that three different groups of four column conductors are connected to the corresponding four conductors 52 according to which of the three rows has a contact set operated. The three different groups mentioned will be referred to as levels, each level thus providing a different four-wire input. The columns are identical with each other.

Of the twelve conductor lengths 52, numbers 1, 5 and 9 are commoned as shown in FIGURE 10 and provide one wire of a four-wire line, numbers 2, 6 and 10 are commoned for the second, numbers 3, 7 and 11 for the third, and numbers 4, 8 and 12 for the fourth. The four-wire input is thus connected to the first, second or third level of column conductors according to which of the level-switching rows is actuated.

By operation of any of the remaining eighteen contact sets for that column the four-wires are connected to corresponding row conductors at one of three levels. As there are eighteen rows and three levels within each row a total of 3×18 four-wire outputs are available from the particular four-wire input.

The modified construction therefore provides 54 four-wire outputs from a single four-wire input instead of, in the basic construction, 21 twelve-wire outputs from a single twelve-wire input.

In general, where the number of tiers is a product of $m.n$, the level-switching facility is provided by using $m$ of the total rows as level-switching rows. In each of these $m$ rows the row conductors are present only in $n$ tiers out of the total $m.n$, the particular group of $n$ being different in each of the $m$ rows. It can be seen that for an $n$-wire input, if $m$ different levels are to be provided, $m.n$ tiers are necessary. The row conductors in these level-switching rows are, as in the embodiment described above, isolated conductor sections of hairpin form.

It will be appreciated that many of the features of the embodiment described above can replace or be replaced by alternative features in the second embodiment to be described. For example the alternative kinds of interposer may be interchanged with obvious adaptations. Similarly the off-normal arrangements of the above switch may be used in the second embodiment.

A second example of a switch in accordance with the invention will now be described with reference to FIGURES 11 to 16 of the accompanying drawings together with certain of the preceding figures which show parts or arrangements similar to the two embodiments.

This second embodiment differs from the first in using electrical rather than mechanical latching of contact sets and also in employing the level-switching technique in the basic switch. Thus this switch accommodates ten four-wire inputs each of which may be connected to any available one of thirty-four wire outputs provided by a ten × three output array.

In FIGURES 11 to 16 of the drawings all references exceed 100 and parts having corresponding parts in FIGURES 1 to 10 have references differing by 100.

Figure 11:
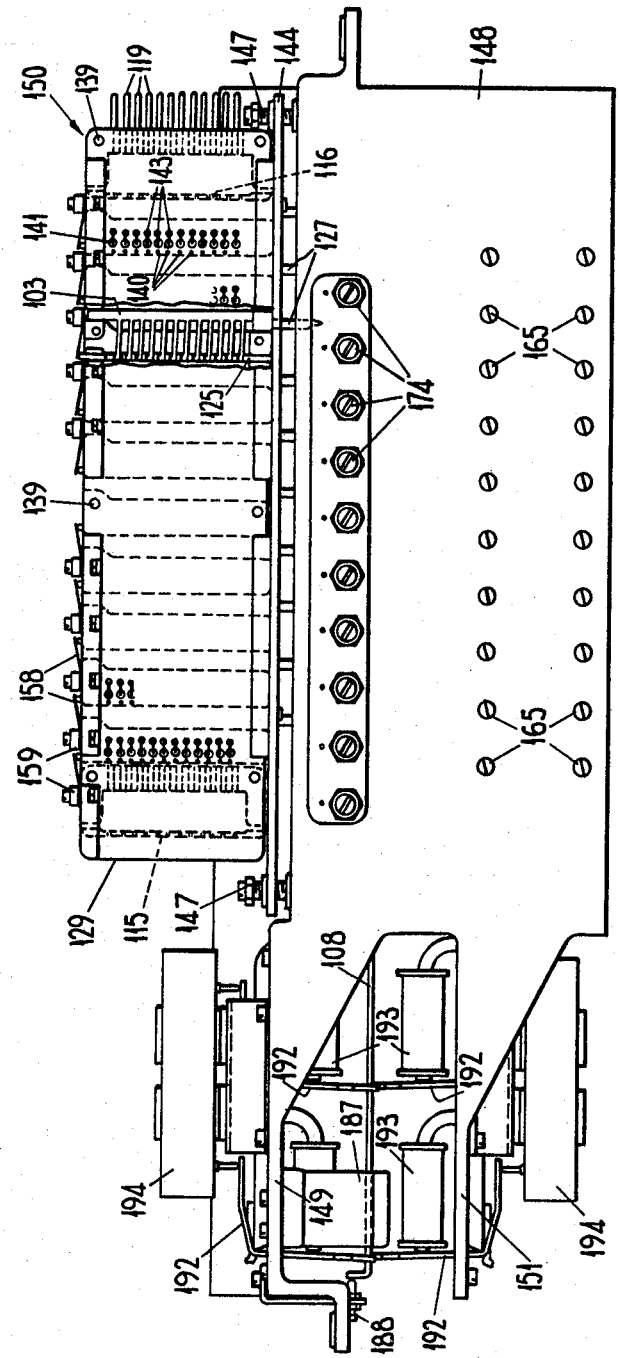
FIGURES 11 to 16 illustrate the second embodiment: more particularly.
Figure 12:
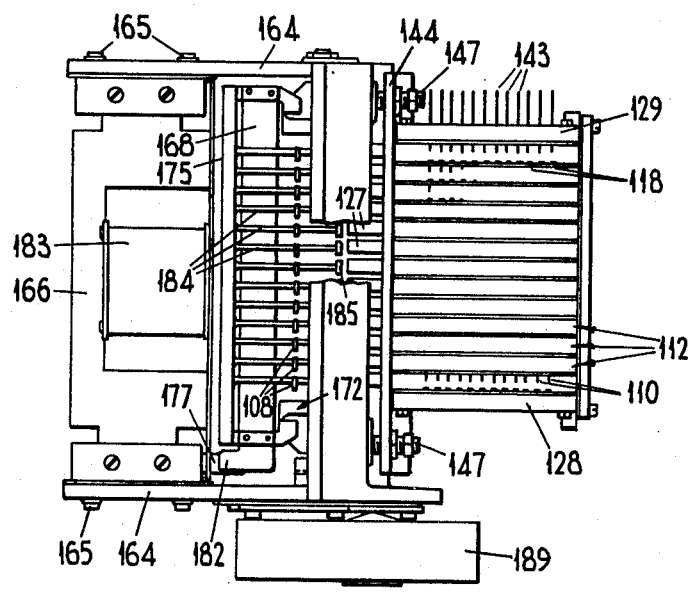
Figure 13:
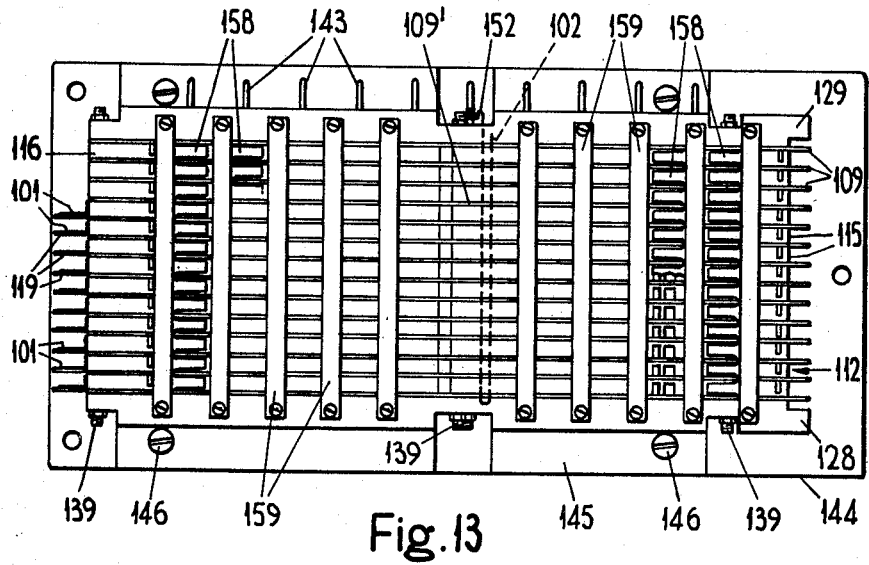

The switch connections are made by a wire matrix similar to that used in the first embodiment. Referring to FIGURES 11, 12 and 13 this matrix 150 is shown in its assembled form. The view shown in FIGURE 11 is an outside view corresponding to the view of a spacer frame shown in FIGURE 2. The spaced frames 112 of the present embodiments are similar to that shown in FIGURE 2, differing in that they accommodate only twelve tiers of row and column conductors 101 and 102. As shown in FIGURES 12 and 13 there are thirteen spacer frames the first three of which accommodate the level-switching rows, as will be explained, while the remaining ten each accommodate twelve tiers of normal row conductors 101. Each spacer frame 112 comprises ten members 114 mounted on an insulating partition 109, each member 114 providing a complete guide for a secondary comb 125 (FIGURE 11) and a partial guide for a primary comb 103 (FIGURES 11 and 12). Adjacent members 114 between them provide a guide for a primary comb 103.

End members 115 and 116 provide end supports for the row conductors 101. The end member 115 has twelve grooves in which the row conductors 101 are carried freely although trapped transversely by the adjacent insulating partition 109. The other end member 116 is provided with 12 close fitting grooves 110 (shown in FIGURE 12) which carry and locate the row conductors 101 with respect to the lower (referring to FIGURES 2 and 11) extremity of the member 116. The end member 116 is also provided with L-shaped blind ended grooves 118 (the open ends of which appear in FIGURE 12) in which connecting tags 119 are trapped by the partition 109 on which the member 116 is mounted.

The row conductors 101, other than for the first three rows, extend between the two end members 115 and 116, and a right-angled double set on exit from the member 116 takes them alongside the respective tags 119 to which they are soldered. As shown in FIGURE 13, there are therefore no tags 119 in the first three rows.

The column conductors 102 are of loop form as in the first embodiment, one such loop being shown in FIGURE 13 in broken line. This broken line conductor shown in FIGURE 13 can be seen to be in two parts, one part 102, the column conductor proper, while the other part 152 extends only through the first three level-switching rows. The partition 109' separating the level-switching from the normal row differs from the remainder of the partitions 109 in having clearance holes for the column conductor loops 102 sufficient for the right-hand leg (as seen in FIGURE 13) of each loop only. This partition 109' therefore provides positive separation between the loop conductor termination and the conductor 152.

The thirteen spacer frames 112 are clamped together between two mouldings 128 and 129 by clamping nuts 139. It is on these mouldings 128 and 129 that springs 158 are mounted, these springs being of generally comb form and being clamped to the face of the matrix by bars 159. The bars 159 are screwed at each end to the respective mouldings 128 and 129. Each tooth of the spring comb 158 provides individual biasing for the secondary combs 125, as shown particularly in FIGURE 11. The moulding 129, as shown in FIGURE 11, has holes 140, 141 corresponding to the two legs of every column conductor loop 102. The left-hand hole 140 of each pair is plain on the outside, while the right-hand hole is countersunk to provide a guide on insertion of a conductor. The longer leg of each column conductor loop 102 terminates within the thickness of the moulding 129 in a hole 140, while each short conductor 152 extends through a hole 141 as far as the partition 109′, its outer end being wrapped around a connecting tag 143 for external connection.

Figure 7:
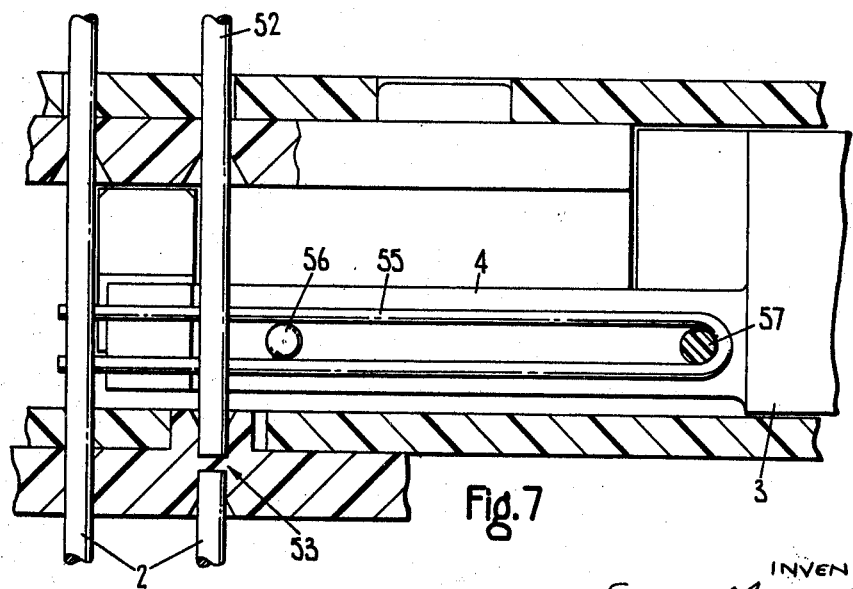

Within the three level-switching spacer frames the primary combs 103 are of the form shown in FIGURES 6 and 7. As mentioned above, the column conductors in the level-switching rows are in the form of twin conductors one of which is connected to, and is in fact an integral extension of, the conductor loop 102, while the other, 152, is connected to a terminal tag 143 for external connection. The row conductors of the level-switching rows are, again as in the first embodiment, not continuous conductors but are isolated conductor sections in the form of hairpins similar to those shown in FIGURES 6 and 7. The operation of a contact set in one of the level-switching rows therefore consists of the bridging of the twin conductors and the connection of a conductor loop 102 to a conductor 152 and thence to a terminal tag 143.

The arrangement of the hairpin conductors in the level-switching rows may be illustrated by reference to FIGURE 10. That figure shows twenty-one rows as opposed to the present thirteen but is otherwise appropriate. Hairpin conductors are positioned in groups of tiers as follows: on the teeth corresponding to tier Nos. 1 to 4 in the first level-switching row, 5 to 8 in the second, and 9 to 12 in the third. Operation of a contact set in a level-switching row will therefore connect only one group of four column conductors to four of the terminal tags 143 for external connection. The particular group of four, i.e., the level, will depend upon which of the level-switching rows the operated contact set is in. The three groups of terminal tags 143 are commoned, one from each group being connected together, to give a net four-wire input. Operation of a contact set in a normal row in the same column will connect all twelve column conductors 102 to the twelve row conductors 101 respectively but only one of three groups within the twelve column conductors 102 will be connected to the four-wire input so that only four of the normal row conductors will be so connected, the particular four depending upon which level-switching row contains the operated contact set.

The matrix assembly 150 is mounted on a plate 144 which provides a reference surface for all of the members 114, 115, 116 of the spacer frames 112 and the secondary combs 125 all of which normally abut against it. The end mouldings 128 and 129 each have flanges 145 which are clamped to the plate 144 by screws 146.

The plate 144 is provided with holes (not shown) to allow the operating extensions 127 of the primary combs 3 to extend through to the switch operating mechanism.

Referring to FIGURES 11 and 12 the matrix 150 together with its mounting plate 144 are mounted upon a casting 148 which houses the switch mechanism by means of three adjustable fixings 147.

The mechanism casting 148 is generally channel-shaped, the matrix assembly 150 being mounted on the back of the channel. At the left-hand end of the casting 148 (FIGURE 11) are formed two shelves 149 and 151 on which select electromagnets for the switch are mounted.

Figure 15:
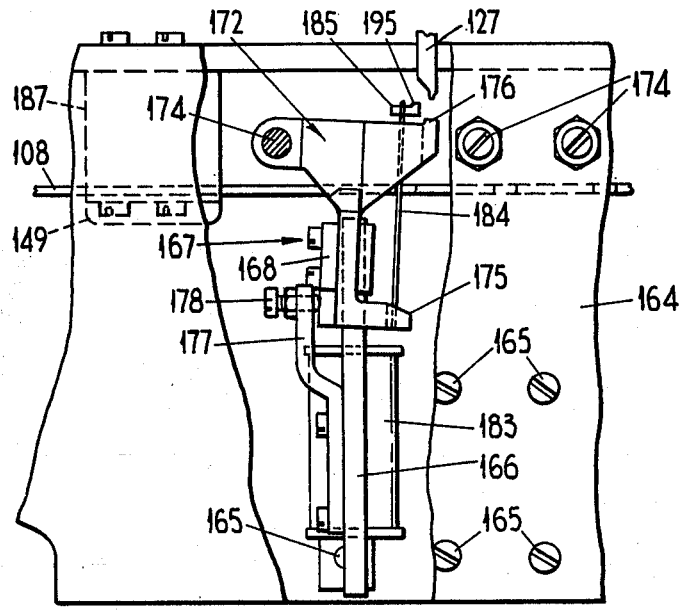

Referring to FIGURES 11, 12 and 15 particularly, mounted between the walls 164 of the casting 148 by means of screws 165 are bridge electromagnet yokes 166 of E form as shown in FIGURE 12. There are ten such yokes 166, one for each column of the matrix 150. Also mounted between the walls 164 are ten armature assemblies 167 for the respective bridge magnets. The assemblies 167 each comprise a magnetic bar 168 extending across the yoke 166 at the ends of the three limbs of the E, the bar 168 being mounted at its ends on a plastics structure 172. The structure 172 comprises side walls 173 each incorporating a pivot bushing which engages adjustable pivots 174 in the walls 164 of the casting 148. The structure 172 also includes a bar 175 and a bar 176 extending between the side walls 173, the two bars being approximately one above the other in a direction transverse to the plane of the matrix and separated by the extent of the armature assembly 167 in that direction.

Attached to one limb of the yoke 166 is a bracket 177 (shown in FIGURES 12, 15 and 16) having an adjustable stop 178. The magnetic armature bar 168 has a lug 182 at one end (FIGURE 12) which is engaged by the stop 178 as shown in FIGURE 15 in the unenergised condition of the bridge magnet winding 183.

Mounted on the lower bar 175 (as viewed in FIGURE 15) of the armature structure 172 is a flexible metal member having arms 184 which are flexible in planes perpendicular to the columns of the matrix, i.e., in the plane of FIGURE 15. There are thirteen arms 184 on each armature assembly, corresponding to the thirteen rows of the matrix. The arms 184 are rigidly clamped at their roots to the bar 175 while at their free end they each carry a nylon block 185 constituting an interposer which, on flexing of the arms 184, moves between a first position remote from the upper bar 176 and a second position immediately over the upper bar 76. The size of the interposer 185, and the length of the arm 184, are such that movement between two such positions is substantially parallel to the plane of the matrix.

Figure 14:
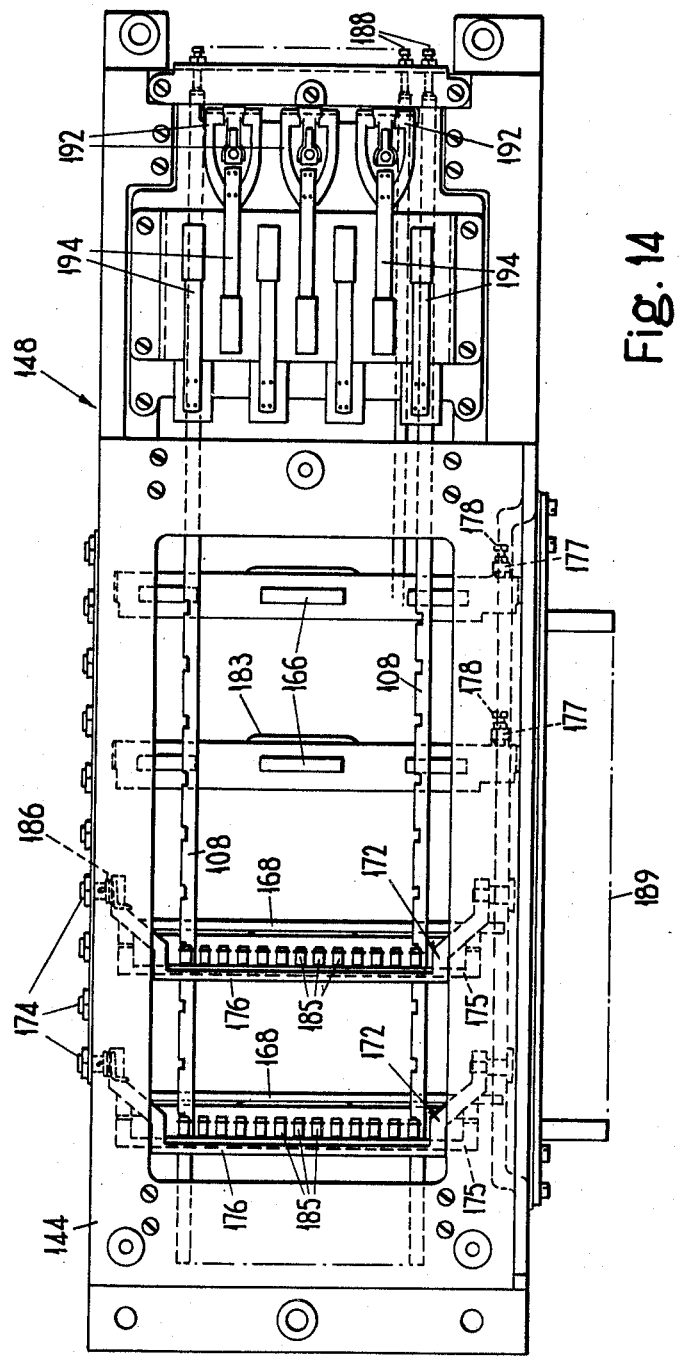

In the unenergised condition of a bridge magnet winding 183, the armature assembly 167 occupies the position shown in FIGURE 15 in which the bar 168 is displaced a short distance from the yoke 166 under the influence of a spring 186 shown in FIGURE 14. In this position of the armature assembly 167 the bar 176 is separated from the extremity 127 of a primary comb 103 by a distance sufficient to allow an interposer 185 to be moved between them. If an interposer 185 is so moved between the bar 176 and the comb extremity 127 and the bridge magnet then energised, the comb is driven transversely to the matrix to operate the associated contact set. Without the interposition of the interposer 185, however, the movement of the bar 176 is insufficient to operate the contact set.

Figure 16:
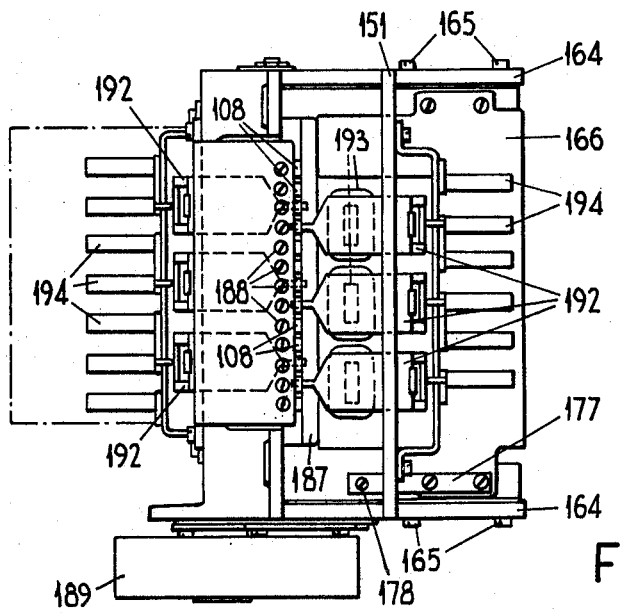

Off-normal indications for the bridge magnets 183 are provided as follows. Referring to FIGURES 12, 14 and 16, ten spring sets 189 are mounted on a plate which is fitted over a recess in one wall 164 of the casting, the spring sets being aligned with the bridge armature bars 168. The spring sets 189 are operated by individual cams (not shown) which are mounted in the above recess and are engaged by the aforementioned lugs 182 of the bars 168 when the bridge magnets are operated. Operation of any bridge magnet to its off-normal condition causes a corresponding spring set 189 to operate.

The selective movement of interposers 185 is effected as follows.

Extending along most of the length of the switch are thirteen select bars 108 lying side by side in a plane parallel to the plane of the matrix and mounted for sliding in three guide blocks 187 fixed as spaced positions along the casting. Each guide block 187 comprises a block of plastics material in one face of which thirteen rectangular section grooves are formed. The grooves are closed by a cap member which is screwed to the main block 187 to provide a sliding fit guide for each select bar 108. Each select bar 108 has ten rectangular notches spaced along one edge so as to engage a row of ten arms 184 corresponding to a row of the matrix. The arms 184 are biased into their inoperative positions remote from their bridge bars 176 by their own resilience, the notches in a select bar 108 being just in engagement with the arms 184 when the arms are in their inoperative position and the select bar is in its extreme released position (to the left in FIGURE 11). The left-hand end of each select bar 108 is turned at right angles to abut a stop 188 mounted on the casting 148.

The thirteen select bars 108 have two further notches in one edge at positions between the shelf-like extensions 149 and 151 of the casting 148. In one or the other of these two notches armatures 192 of thirteen select electromagnets 193 engage, each select bar 108 thus being controlled by an individual select magnet 193.

The select magnets are mounted seven on the upper shelf 149 and six on the lower shelf 151, the armatures 192 from the two sets being directed towards each other and arranged to engage the select bars 108. As shown in FIGURE 11 each armature 192 is of generally L form, one arm engaging a select bar 108 and the other actuating a spring set 194. The spring sets 194 primarily provide an indication of the off-normal position of a corresponding select bar and in addition have further contacts for supervising purposes.

In operation of the switch first a select magnet of a level-switching row is operated to determine the level of the output, i.e. which of three different groups is to be connected. Then a select magnet of a normal row is operated and finally a bridge magnet is operated. When the bridge magnet has been operated the select magnets are released as the two interposer members in the column in question will be trapped between their combs 103 and the bridge bar 176. A holding current is maintained on the bridge magnet and the selected four-wire path through the switch is established. Trapping of the interposers 185 is ensured by the presence of a lip 195 on the leading edge of the interposers 185 this lip obstructing escape past the comb extremity 127 bearing upon the interposer.

The presence of an operated interposer in a row does not prevent further use of that row as the flexible arm 184 of a trapped interposer can accommodate the movement of the select bar 108 in the operation of a further interposer. Ten four-wire inputs to the switch can therefore be connected to any ten of thirty four-wire outputs.

We claim:

1. A coordinate switch comprising a two-coordinate matrix of contact sets, a plurality of operating members each mounted adjacent a respective contact set in operative relation therewith, a plurality of interposer members each mounted for movement parallel to the plane of the matrix, and, independently, transverse to the matrix, each interposer member being operatively associated with a respective operating member, a system of first coordinate members mounted for movement parallel to the plane of the matrix and defining groups of contact sets and associated interposer members according to one of the two coordinates of the matrix arrangement, a system of second coordinate members mounted for movement transverse to the matrix and defining groups of contact sets and associated inteposer members according to the other of the two coordinates of the matrix arrangement, each interposer member being coupled with the system of first coordinate members so as to be movable thereby parallel to the plane of the matrix and with the system of second coordinate members so as to be movable thereby transverse to the matrix, first electromagnetic means effective to operate said system of first coordinate members selectively and move a group of interposer members parallel to the plane of the matrix into positions in which they are effective to move their respective operating members, second electromagnetic means effective to operate said system of second coordinate members selectively and move a selected one of said group of interposer members into operative engagement with the associated operating member to operate the selected contact set.

2. A coordinate switch according to claim 1, wherein the contact sets are arranged in rows and columns, each interposer member is mounted on a respective arm extending transversely to the matrix, each said second coordinate member comprises a column member on which the arms associated with a respective column of contact sets are mounted, and the arms associated with each row of contact sets are coupled to a row member constituting a said first coordinate member.

3. A coordinate switch according to claim 2, wherein said arms are flexible and are rigidly mounted at one end thereof on a said column member, the movement of a said interposer member parallel to the plane of the matrix being provided by flexure of the associated arm through a small angle.

4. A coordinate switch according to claim 3, wherein each said column member is rigidly attached to a bar which is parallel to the respective column, is movable transversely to the matrix towards the respective column of operating members by operation of said second electromagnetic means but which at its nearest position to said column of operating members is separated therefrom by a distance which is less than the dimension of said interposer member in the same direction, said column member and its attached bar being so disposed relative to each other that an interposer member can be interposed between said bar and an operating member by selective operation of said first electromagnetic means and the operating member can then be moved by selective operation of said second electromagnetic means.

5. A coordinate switch according to claim 4, wherein the flexibility of said arms is such as to allow one interposer member of a row to be trapped between its associated operating member and a said bar when the remaining interposer members of the row revert to their ineffective position on de-energisation of the respective first electromagnetic means.

6. A coordinate switch according to claim 5, wherein each interposer member comprises a rectangular block of material having a lip at the leading edge with respect to movement into the operative position, the lip being directed towards the matrix so as to engage the associated operating member and obstruct the escape of the interposer member from the trapped position.

7. A coordinate switch according to claim 1, and comprising biasing means associated with each interposer member effective to bias it in a direction transverse to the matrix, said system of second coordinate members being effective to move each interposer member against said bias, the interposer members when so moved against said bias being engageable by said system of second coordinate members for movement parallel to the plane of the matrix and into positions from which transverse movement of an interposer member subject to said bias is effective to move the associated operating member and operate the associated contact set.

8. A coordinate switch according to claim 7, and comprising further biasing means associated with each interposer member respectively and effective to bias each interposer member out of its position from which transverse movement is effective to operate a contact set, the interposer members each having a detent which mechanically latches them in their operated position against the said further biasing means, momentary operation of the respective second coordinate members being effective to unlatch a latched interposer member and allow it to return to its ineffective position subject to said further biasing means.

9. A coordinate switch according to claim 8, wherein the contact sets are arranged in rows and columns and wherein said second electromagnetic means comprises an electromagnet associated with each column respectively, each said electromagnet having an armature which constitutes one of said second coordinate members, the interposer members associated with each column of contact sets being pivotally mounted on the respective armature, pivotal movement of an interposer member through a small angle constituting said movement parallel to the plane of the matrix.

10. A coordinate switch according to claim 9, wherein each said first coordinate member is a bar associated with a respective row of contact sets and having regularly spaced apertures which embrace the interposer members of the respective row.

11. A coordinate switch according to claim 9, and comprising a row of contact sets reserved as off-normal contact sets one for each column respectively, an off-normal interposer member for each off-normal contact set respectively, each off-normal interposer member being pivotally mounted on a respective said armature and being loosely coupled to the other interposer members on the same said armature, biasing means for said off-normal interposer member effective to bias it into its operative position, coupling means between each off-normal interposer and the remaining interposer members on the same said armature effective to withhold the off-normal interposer member from its operative position when any of said remaining interposer members is in its operative position.

12. A coordinate switch according to claim 11, wherein said coupling means is a bar mounted on said off-normal interposer member and extending parallel to a column adjacent to each of said remaining interposer members on a said armature.

13. A coordinate switch according to claim 9, wherein each interposer member is a longitudinal member pivoted at one end thereof on a said armature, the cross section of an interposer varying along its length to permit selective engagement by a said first coordinate member according to the longitudinal position of the interposer member.

14. A coordinate switch according to claim 1, wherein said matrix of contact sets comprises a plurality of row conductors and a plurality of column conductors, the row and column conductors being spaced apart at the cross points to constitute a contact set at each cross point, each said operating member being mounted for movement transverse to the matrix to deflect a row conductor into contact with a column conductor at a respective cross point.

15. A coordinate switch according to claim 14 wherein said matrix of contact sets comprises a plurality of tiers of conductors each tier comprising a plurality of row conductors and a plurality of column conductors so that each contact set comprises a plurality of contact pairs which are disposed one pair in each of said tiers and each pair comprising a row and a column conductor so that all of the plurality of contact pairs of each contact set are operable in unison of by the associated operating member.

16. A coordinate switch according to claim 15, wherein each operating member comprises a respective primary comb having a number of teeth equal to the number of tiers, the teeth interleaving with the tiers and the tips of the teeth being aligned with an associated said cross point so that on movement of a comb member transverse to the matrix, the row conductors at the cross point are deflected by the teeth of the primary comb member and contact is made between the row and column conductors of each pair of contacts at the cross point.

17. A coordinate switch according to claim 16, and comprising, at each cross point of the matrix, a secondary comb member resiliently mounted so as to bear upon each row conductor in a direction such as to oppose contact between the row and column conductors at the respective cross point, a row conductor thereby being supported against deflection at points spaced by approximately twice the column pitch when the row conductor is deflected between those points by a primary comb member in the operation of a contact set.

18. A coordinate switch according to claim 17, and comprising partitions which separate the rows of the matrix and through which the column conductors extend, the column conductors being tightly supported in the partitions and the pitch of the columns being several times that of the rows so that the column conductors, constituting fixed contacts, are more rigidly supported than the row conductors, constituting movable contacts.

19. A coordinate switch according to claim 18, and comprising a plurality of insulating members including one for each column, mounted on each said partition respectively said column-conductors being supported in close-fitting holes provided in the said insulating members.

20. A coordinate switch according to claim 19, and comprising a plate disposed in a plane parallel to that of the matrix, the matrix being mounted on said plate so that said insulating members and said secondary comb members abut the plate, the plate providing a reference surface for the position of the row and column conductors transverse to the plane of the matrix.

21. A coordinate switch according to claim 20, and comprising spring biasing means for each said secondary comb member respectively said spring biasing means being effective to bias said secondary combs into abutment with said plate.

22. A coordinate switch according to claim 16 wherein the teeth of each said primary comb have a length which is nearly equal to the pitch of the columns.

23. A coordinate switch according to claim 22 wherein the tip of each tooth of each primary comb is curved about an axis parallel to the columns of the matrix so as to present a convex surface to the engaged row conductor.

24. A coordinate switch according to claim 16 wherein the matrix comprises $m.n$ tiers, where $m$ and $n$ are plural integers, and wherein in addition to the aforesaid normal rows providing row coordinate paths through the switch, there are $m$ rows in each of which the row conductors are present only in $n$ tiers the groups of $n$ tiers being wholly different in each of the $m$ rows, the row conductors in the $m$ rows each being in the form of a row of isolated conductor sections, one for each column, and wherein column conductors extend through the $m$ rows in twin conductor form one of which twin conductors is connected to the column conductor in the said normal rows and the other of which twin conductors is connected to a terminal providing an external connection to the switch, the operation of a contact set in one of said $m$ rows consisting of the bridging of said twin conductors by a said conductor section in each tier of a group of $n$ tiers, the arrangement being such that for each column of the switch an $n$-wire input to the switch is connected to any of $m$ $n$-wire outputs from the switch for each normal row of the switch according to which of the said $m$ rows is selected for the operation of a contact set.

25. A coordinate switch according to claim 24 wherein each said conductor section comprises a hairpin shaped conductor mounted upon a tooth of a said primary comb member.

References Cited

UNITED STATES PATENTS

| | | | |
|---|---|---|---|
| 2,338,181 | 1/1944 | Holden | 335—112 |
| 3,364,447 | 1/1968 | Peek | 335—112 |
| 3,387,238 | 6/1968 | Takamura | 335—112 |

BERNARD A. GILHEANY, Primary Examiner

H. BROOME, Assistant Examiner